US012231872B2

(12) United States Patent
Xue et al.

(10) Patent No.: US 12,231,872 B2
(45) Date of Patent: Feb. 18, 2025

(54) AUDIO SIGNAL PLAYING METHOD AND APPARATUS, AND ELECTRONIC DEVICE

(71) Applicant: Beijing Youzhuju Network Technology Co., Ltd., Beijing (CN)

(72) Inventors: Zheng Xue, Beijing (CN); Yangfei Xu, Beijing (CN); Wenzhi Fan, Beijing (CN); Zhifei Zhang, Beijing (CN); Yuzhou Gong, Beijing (CN); Zejun Ma, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/589,768

(22) Filed: Feb. 28, 2024

(65) Prior Publication Data

US 2024/0205634 A1 Jun. 20, 2024

Related U.S. Application Data

(63) Continuation of application No. PCT/CN2022/120276, filed on Sep. 21, 2022.

(30) Foreign Application Priority Data

Sep. 24, 2021 (CN) .......................... 202111122077.2

(51) Int. Cl.
*H04S 7/00* (2006.01)
*G10L 19/008* (2013.01)
(Continued)

(52) U.S. Cl.
CPC ............ *H04S 7/306* (2013.01); *G10L 19/008* (2013.01); *H04R 1/406* (2013.01); *H04R 3/005* (2013.01);
(Continued)

(58) Field of Classification Search
CPC ...... H04S 7/306; H04S 7/304; H04S 2400/11; G10L 19/008; H04R 1/406; H04R 3/005; H04R 3/12; H04R 2201/40
(Continued)

(56) References Cited

U.S. PATENT DOCUMENTS

2017/0070835 A1* 3/2017 Silva .................... G11B 27/034
2017/0078819 A1* 3/2017 Habets .................... H04S 5/005
(Continued)

FOREIGN PATENT DOCUMENTS

CN 105792090 A 7/2016
CN 108616789 A 10/2018
(Continued)

OTHER PUBLICATIONS

ISA China National Intellectual Property Administration, International Search Report Issued in Application No. PCT/CN2022/120276, Nov. 28, 2022, WIPO, 5 pages.

*Primary Examiner* — William A Jerez Lora
(74) *Attorney, Agent, or Firm* — Alleman Hall & Tuttle LLP

(57) ABSTRACT

An audio signal playing method and apparatus, and an electronic device are provided. The method comprises: separating, from a first audio signal, a recorded audio signal corresponding to each of at least one sound source; on the basis of the first audio signal, determining a real-time orientation of each of the at least one sound source relative to the head of a user; for each sound source, according to the real-time orientation of the sound source and the recorded audio signal corresponding to the sound source, generating a target direct audio signal corresponding to the sound source, and generating a target reverberated audio signal corresponding to the sound source; and playing a second audio signal that is generated by means of fusing the target
(Continued)

direct audio signal and the target reverberated audio signal corresponding to each sound source.

17 Claims, 5 Drawing Sheets

(51) Int. Cl.
*H04R 1/40* (2006.01)
*H04R 3/00* (2006.01)
*H04R 3/12* (2006.01)

(52) U.S. Cl.
CPC ............... *H04R 3/12* (2013.01); *H04S 7/304* (2013.01); *H04R 2201/40* (2013.01); *H04S 2400/11* (2013.01)

(58) Field of Classification Search
USPC ................................................. 381/1, 17, 63
See application file for complete search history.

(56) References Cited

U.S. PATENT DOCUMENTS

| | | | |
|---|---|---|---|
| 2017/0278519 A1 | 9/2017 | Visser et al. | |
| 2019/0394564 A1* | 12/2019 | Mehra .................... | H04R 3/005 |

FOREIGN PATENT DOCUMENTS

| | | | |
|---|---|---|---|
| CN | 109584892 | A | 4/2019 |
| CN | 109660911 | A | 4/2019 |
| CN | 109831735 | A | 5/2019 |
| CN | 110505403 | A | 11/2019 |
| CN | 111654806 | A | 9/2020 |
| CN | 111868823 | A | 10/2020 |
| CN | 112799018 | A | 5/2021 |
| CN | 113889140 | A | 1/2022 |
| WO | 2019164029 | A1 | 8/2019 |

* cited by examiner

AUDIO SIGNAL PLAYING METHOD AND APPARATUS, AND ELECTRONIC DEVICE

CROSS-REFERENCE TO RELATED APPLICATION(S)

This application is a Continuation Application of International Patent Application No. PCT/CN2022/120276, filed Sep. 21, 2022, which claims priority to Chinese Application No. 202111122077.2 filed Sep. 24, 2021, the disclosures of which are incorporated herein by reference in their entities.

FIELD

Embodiments of the present disclosure relate to the technical field of computers, and in particular, to an audio signal playing method and apparatus, and an electronic device.

BACKGROUND

In practical applications, after an audio signal is recorded, a user often needs to play back the recorded audio signal. When the recorded audio signal is played back, the playing effect of the audio signal may be enhanced through various means, so as to improve the feeling of the user.

In related arts, the recorded audio signal is played by a dedicated playing device, so as to enhance the playing effect of the audio signal. In this way, hardware requirements for the playing device are often relatively high, therefore the manufacturing cost of the device may be increased.

SUMMARY

The Summary of the Disclosure is provided to introduce concepts in a brief form, and these concepts will be described in detail in the following detailed description. The Summary of the Disclosure is not intended to identify key features or essential features of the claimed technical solutions, nor is it intended to limit the scope of the claimed technical solutions.

Embodiments of the present disclosure provide an audio signal playing method and apparatus, and an electronic device, which method may accurately restore a sound field formed by at least one sound source.

In a first aspect, an embodiment of the present disclosure provides an audio signal playing method. The method includes: separating, from a first audio signal, a recorded audio signal corresponding to each of at least one sound source; on the basis of the first audio signal, determining a real-time orientation of each of the at least one sound source relative to the head of a user; for each sound source, according to the real-time orientation of the sound source and the recorded audio signal corresponding to the sound source, generating a target direct audio signal corresponding to the sound source, and generating a target reverberated audio signal corresponding to the sound source; and playing a second audio signal generated by fusing the target direct audio signal and the target reverberated audio signal corresponding to each sound source.

In a second aspect, an embodiment of the present disclosure provides an audio signal playing apparatus. The apparatus includes: a separating unit, used for separating, from a first audio signal, a recorded audio signal corresponding to each of at least one sound source; a determining unit, used for: on the basis of the first audio signal, determining a real-time orientation of each of the at least one sound source relative to the head of a user; a generating unit, used for: for each sound source, according to the real-time orientation of the sound source and the recorded audio signal corresponding to the sound source, generating a target direct audio signal corresponding to the sound source, and generating a target reverberated audio signal corresponding to the sound source; and a playing unit, used for playing a second audio signal generated by fusing the target direct audio signal and the target reverberated audio signal corresponding to each sound source.

In a third aspect, an embodiment of the present disclosure provides an electronic device, including: at least one processor; and a storage, used for storing at least one program, wherein the at least one program is executed by the at least one processor, so that the at least one processor implements the audio signal playing method as described in the first aspect.

In a fourth aspect, an embodiment of the present disclosure provides a computer-readable medium, on which a computer program is stored, wherein when executed by a processor, the program implements the steps of the audio signal playing method as described in the first aspect.

BRIEF DESCRIPTION OF THE DRAWINGS

The above and other features, advantages and aspects of the embodiments of the present disclosure will become more apparent in conjunction with the drawings and with reference to the following detailed description. Throughout the drawings, the same or similar reference signs refer to the same or similar elements. It should be understood that the drawings are schematic, and original members and elements are not necessarily drawn to scale.

DETAILED DESCRIPTION OF EMBODIMENTS

Figure 1:
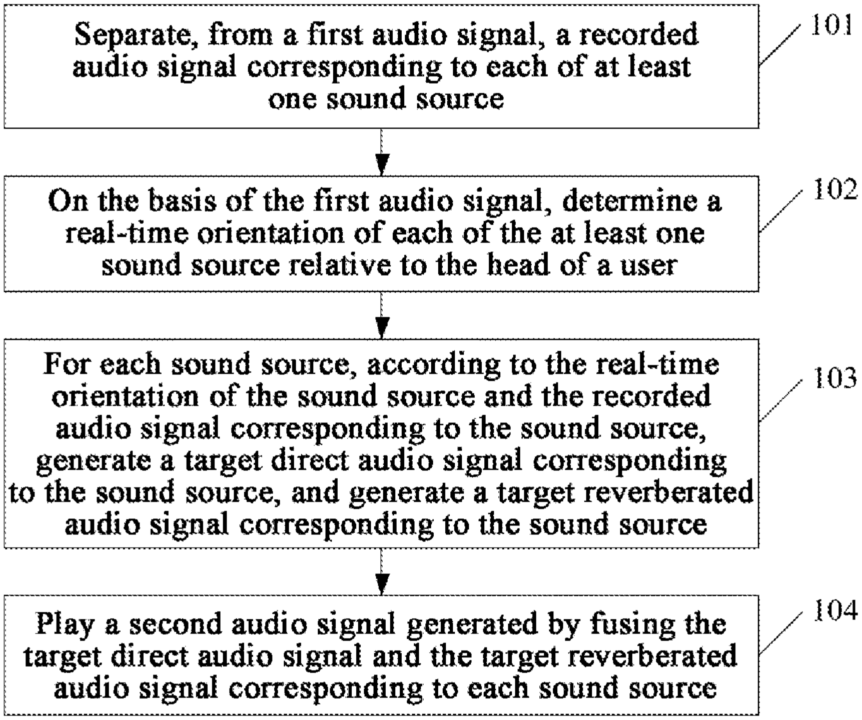
FIG. 1 is a flowchart of some embodiments of an audio signal playing method of the present disclosure.

Hereinafter, embodiments of the present disclosure will be described in more detail with reference to the drawings. Although some embodiments of the present disclosure have been illustrated in the drawings, it should be understood that the present disclosure may be implemented in various forms and should not be construed as being limited to the embodiments set forth herein; and rather, these embodiments are provided to help understand the present disclosure more thoroughly and completely. It should be understood that the drawings and embodiments of the present disclosure are for exemplary purposes only and are not intended to limit the protection scope of the present disclosure.

It should be understood that various steps recited in method embodiments of the present disclosure may be performed in a different order and/or in parallel. In addition, the method embodiments may include additional steps and/or omit performing the steps shown. The scope of the present disclosure is not limited in this respect.

As used herein, the terms "include" and variations thereof are open-ended terms, i.e., "including, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that definitions such as "first" and "second" mentioned in the present disclosure are only intended to distinguish between different apparatuses, modules or units, and are not intended to limit the order or interdependence of the functions performed by these apparatuses, modules or units.

It should be noted that the modifiers such as "one" and "more" mentioned in the present disclosure are intended to be illustrative and not restrictive, and those skilled in the art should understand that they should be interpreted as "one or more" unless the context clearly indicates otherwise.

The names of messages or information interacted between a plurality of apparatuses in the embodiments of the present disclosure are for illustrative purposes only and are not intended to limit the scope of such messages or information.

Referring to FIG. 1, it illustrates a flowchart of some embodiments of an audio signal playing method according to the present disclosure. As shown in FIG. 1, the audio signal playing method includes the following steps:

Step 101: separating, from a first audio signal, a recorded audio signal corresponding to each of at least one sound source.

The first audio signal may be a recorded audio signal. The first audio signal includes the recorded audio signal corresponding to each of the at least one sound source. It can be understood that the recorded audio signal corresponding to the sound source may be an audio signal recorded for sound generated by the sound source.

Optionally, the first audio signal is an audio signal recorded using a microphone array. At this time, the first audio signal is formed by audio signals recorded in a plurality of orientations. The microphone array may be disposed on a terminal device, and may also be disposed on a recording device (e.g., a recording pen) other than the terminal device.

In some scenarios, an execution body of the audio signal playing method may use various audio signal separation algorithms to process the first audio signal, so as to separate, from the first audio signal, the recorded audio signal corresponding to each of the at least one sound source. For example, the audio signal separation algorithm may include, but is not limited to, an IVA (Independent Vector Analysis) algorithm, an MVDR (Minimum Variance Response) algorithm, etc.

Step 102: on the basis of the first audio signal, determining a real-time orientation of each of the at least one sound source relative to the head of a user.

During the process of recording the first audio signal, the sound source may move. Thus, the orientation of the sound source relative to the head of the user may change. For example, the orientation of the sound source relative to the head of the user may be right ahead, right behind, left front, left back, right front, right back, right above, etc.

In some scenarios, the above execution body may input the first audio signal into an orientation recognition model, so as to obtain the real-time orientation, relative to the head of the user, of each sound source output by the orientation recognition model. The orientation recognition model may be a neural network model for recognizing, from the audio signal, the real-time orientation of each sound source relative to the head of the user.

Step 103: for each sound source, according to the real-time orientation of the sound source and the recorded audio signal corresponding to the sound source, generating a target direct audio signal corresponding to the sound source, and generating a target reverberated audio signal corresponding to the sound source.

The sound propagated to the ears of the user by the sound source includes direct sound and reverberation sound. The direct sound may be sound that is directly propagated to the ears of the user without being reflected. The reverberation sound may be sound that is propagated to the ears of the user after being reflected.

It can be understood that the recorded audio signal is formed by at least one of the following: a direct audio signal corresponding to the direct sound propagated to the ears of the user, and a reverberated audio signal corresponding to the reverberation sound propagated to the ears of the user.

The target direct audio signal may be a direct audio signal extracted from the recorded audio signal. The target reverberated audio signal may be a reverberated audio signal extracted from the recorded audio signal.

In some scenarios, the above execution body may input, into a first extraction model, the real-time orientation of the sound source and the recorded audio signal corresponding to the sound source, so as to obtain the target direct audio signal output by the first extraction model. The first extraction model may be a neural network model for extracting the direct audio signal corresponding to the sound source. Similarly, the above execution body may input, into a second extraction model, the real-time orientation of the sound source and the recorded audio signal corresponding to the sound source, so as to obtain the target reverberated audio signal output by the second extraction model. The second extraction model may be a neural network model for extracting the reverberated audio signal corresponding to the sound source.

It can be understood that if the orientation of the sound source relative to the head of the user changes, the direct sound and the reverberation sound, which are propagated to the ears of the user by the sound source, also change. Therefore, according to the real-time orientation of the sound, the direct audio signal and the reverberated audio signal, which correspond to the sound source, can be accurately extracted.

Step 104: playing a second audio signal generated by fusing the target direct audio signal and the target reverberated audio signal corresponding to each sound source.

The second audio signal may include a left channel audio signal and a right channel audio signal.

In some scenarios, the above execution body may fuse, into the second audio signal, the target direct audio signal corresponding to each sound source and the target reverberated audio signal corresponding to each sound source. Further, the above execution body may play the second audio signal.

It should be noted that the above execution body may play the second audio signal via a speaker, and may also play the second audio signal via an earphone.

It can be understood that the second audio signal contains an audio signal corresponding to the sound generated by each of the at least one sound source. By means of playing the second audio signal, the sound field formed by the at least one sound source may be restored.

In the present embodiment, the direct audio signal corresponding to the sound source and the reverberated audio signal corresponding to the sound source are extracted according to the according to the real-time orientation of the sound source relative to the head of the user. Therefore, by means of considering the movement of the sound source, the target direct audio signal and the target reverberated audio signal, which corresponds to the sound source, are extracted more accurately. Further, by means of playing the second audio signal, the sound field formed by the at least one sound source can be accurately restored.

In some embodiments, the above execution body may determine the real-time orientation of each sound source relative to the head of the user in the following manner.

Step 1: determining a movement trajectory of each of the at least one sound source on the basis of the first audio signal.

The movement trajectory may contain the location of the sound source on at least one moment.

In some scenarios, the above execution body may input the first audio signal into a location recognition model, so as to obtain the location of each sound source at the at least one moment, which is output by the location recognition model. The location recognition model may be a neural network model for recognizing the location of the sound source at the at least one moment. Further, for each sound source, the above execution body may determine the movement trajectory of the sound source according to the location of the sound source at the at least one moment.

Step 2: for each sound source, determining a real-time location of the sound source from the movement trajectory of the sound source, and determining the real-time orientation of the sound source relative to the head of the user on the basis of the real-time location of the sound source and real-time posture data of the head of the user.

The real-time posture data of the head of the user may be data that is collected in real time and represents the posture of the head of the user. The real-time posture data may include a pitch angle and an azimuth angle of the head of the user.

In some scenarios, the earphone in communication connection with the terminal device is provided with an accelerometer, an angular velocity meter, a gyroscope and other posture detection sensors. The earphone may send, to the terminal device, an acceleration, an angular velocity and a magnetic induction intensity, which are collected by the posture detection sensor. Further, the above execution body may determine the pitch angle and the azimuth angle of the head of the user according to the acceleration, the angular velocity and the magnetic induction intensity, which are sent by the earphone.

It can be understood that the movement of the sound source and a change in the posture of the head of the user may both cause a change in the orientation of the sound source relative to the head of the user. Therefore, according to the real-time location of the sound source and the real-time posture data of the head of the user, the orientation of the sound source relative to the head of the user can be accurately determined in real time.

In some embodiments, the above execution body may determine the movement trajectory of each sound source in the following manner.

Specifically, the first audio signal is processed by using a sound source positioning algorithm and a sound source tracking algorithm, so as to determine the movement trajectory of each of the at least one sound source.

The sound source positioning algorithm is used for positioning the real-time location of the sound source. For example, the sound source positioning algorithm may include, but is not limited to, a GCC (Generalized Cross Correlation) algorithm, a GCC-PHAT (Generalized Cross Correlation-Phase Transform) algorithm, etc.

The sound source tracking algorithm is used for determining the movement trajectory of the sound source by tracking the real-time location of the sound source.

It can be understood that the movement trajectory of the sound source can be quickly and accurately determined by means of the sound source positioning algorithm and the sound source tracking algorithm. Further, a sound field formed by the at least one sound source can be quickly and accurately restored.

Figure 2:
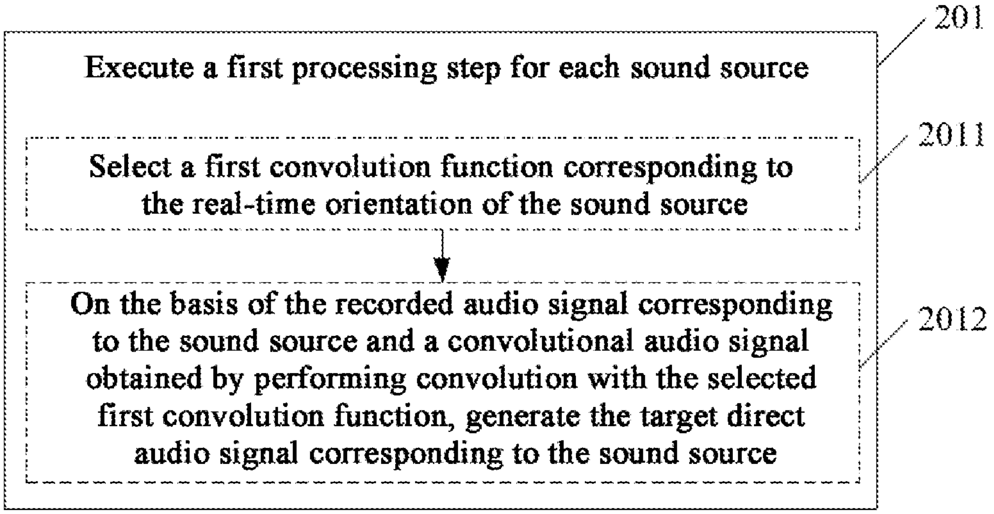
FIG. 2 is a flowchart of generating a target direct audio signal in some embodiments according to an audio signal playing method of the present disclosure.

In some embodiments, according to the flow as shown in FIG. 2, the above execution body may generate the target direct audio signal corresponding to the sound source, wherein the flow includes step 201.

Step 201: executing a first processing step for each sound source. The first processing step includes step 2011 to step 2012.

Step 2011: selecting a first convolution function corresponding to the real-time orientation of the sound source.

The first convolution function is used for extracting, from the audio signal, the target direct audio signal corresponding to the sound source. Optionally, the first convolution function is an HRTF (Head Related Transfer Function).

The sound source is provided with a corresponding first convolution function relative to each orientation of the head of the user. The above execution body may select, from the provided first convolution functions, the first convolution function corresponding to the real-time orientation of the sound source.

Step 2012: on the basis of the recorded audio signal corresponding to the sound source and a convolutional audio signal obtained by performing convolution with the selected first convolution function, generating the target direct audio signal corresponding to the sound source.

The convolutional audio signal may be a convolution result of the recorded audio signal and the first convolution function.

In some scenarios, the above execution body may use the obtained convolutional audio signal as the target direct audio signal corresponding to the sound source.

It can be understood that direct sounds propagated to the ears of the user from sound sources in different orientations are different. Therefore, on the premise of considering the movement of the sound source, the target direct audio signal corresponding to the sound source is accurately extracted, by using the first convolution function, from the recorded audio signal corresponding to the sound source.

In some embodiments, the above execution body may execute the step 2012 in the following manner.

Specifically, based on an actual distance between the sound source and the head of the user, the convolutional audio signal is corrected to generate the target direct audio signal corresponding to the sound source.

During the process of playing back the audio signal, the sound source may move, resulting in a change in the actual distance with the head of the user. The first convolution function may determine the convolutional audio signal on the basis of a preset distance between the sound source and the head of the user. Therefore, there may be an error between the convolutional audio signal obtained by the first convolution function and the target direct audio signal.

It can be understood that, the convolutional audio signal is corrected based on the movement of the sound source, so that the error of the finally obtained target direct audio signal can be reduced.

Figure 3:
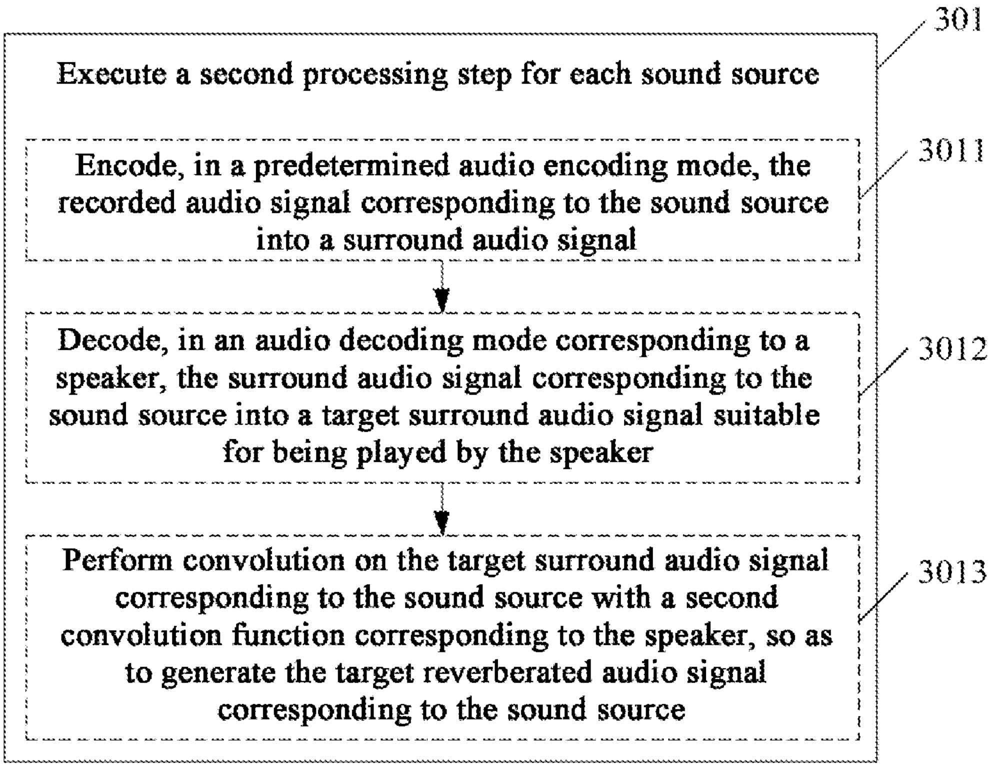
FIG. 3 is a flowchart of generating a target reverberated audio signal in some embodiments according to an audio signal playing method of the present disclosure.

In some embodiments, according to the flow as shown in FIG. 3, the above execution body may generate the target reverberated audio signal corresponding to the sound source, and the flow includes step 301.

Step 301: executing a second processing step for each sound source. The second processing step includes step 3011 to step 3013.

Step 3011: encoding, in a predetermined audio encoding mode, the recorded audio signal corresponding to the sound source into a surround audio signal.

The predetermined audio encoding mode may be an audio encoding mode for encoding the recorded audio signal into the surround audio signal. The surround audio signal generated in the predetermined audio encoding mode contains audio signals of a target number of channels. The surround audio signal may be an audio signal corresponding to surround sound. In practice, the surround sound has a sense of depth, which may give the user an immersive feeling.

Optionally, the predetermined audio encoding mode is an Ambisonic encoding mode. In some scenarios, the surround audio signal generated in the Ambisonic encoding mode may contain audio signals of four channels.

Step 3012: decoding, in an audio decoding mode corresponding to a speaker, the surround audio signal corresponding to the sound source into a target surround audio signal suitable for being played by the speaker.

In practical applications, the speaker has a corresponding audio decoding mode.

Step 3013: performing convolution on the target surround audio signal corresponding to the sound source with a second convolution function corresponding to the speaker, so as to generate the target reverberated audio signal corresponding to the sound source.

The second convolution function is used for extracting, from the audio signal, the target reverberated audio signal corresponding to the sound source. Optionally, the second convolution function is an RIR (room impulse response) function.

In practical applications, different speakers generally have different properties. Therefore, corresponding second convolution functions are set for different speakers, and target reverberated audio signals matching the properties of the speakers may be extracted.

It can be understood that, in combination with the predetermined audio encoding mode and the second convolution function, when the target reverberated audio signal is extracted, not only can the properties of the speaker be considered, but the sound surround feeling of the user for the finally extracted target reverberated audio signal can also be enhanced. Therefore, the target reverberated audio signal with high accuracy and good sound surround effect for the user can be extracted from the recorded audio signal. Further, by means of playing the second audio signal, the feeling of the user in a real sound field may be enhanced.

Figure 4:
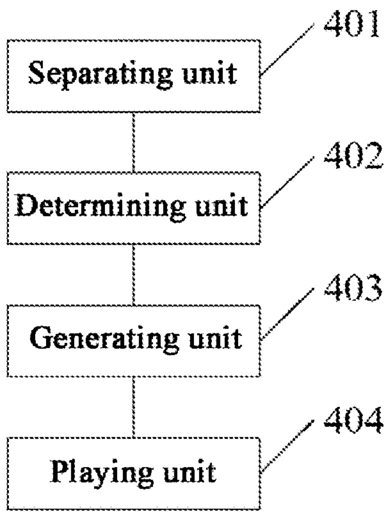
FIG. 4 is a schematic structural diagram of some embodiments of an audio signal playing apparatus of the present disclosure.

Referring further to FIG. 4, as an implementation of the method shown in the above figures, the present disclosure provides some embodiments of an audio signal playing apparatus, the apparatus embodiment corresponding to the method embodiment shown in FIG. 1, and the apparatus may be specifically applied to various electronic devices.

As shown in FIG. 4, the audio signal playing apparatus of the present embodiment includes: a separating unit 401, a determining unit 402, a generating unit 403 and a playing unit 404, wherein the separating unit 401 is used for separating, from a first audio signal, a recorded audio signal corresponding to each of at least one sound source; the determining unit 402 is used for: on the basis of the first audio signal, determining a real-time orientation of each of the at least one sound source relative to the head of a user; the generating unit 403 is used for: for each sound source, according to the real-time orientation of the sound source and the recorded audio signal corresponding to the sound source, generating a target direct audio signal corresponding to the sound source, and generating a target reverberated audio signal corresponding to the sound source; and the playing unit 404 is used for playing a second audio signal generated by fusing the target direct audio signal and the target reverberated audio signal corresponding to each sound source.

In the present embodiment, with regard to the specific processing of the separating unit 401, the determining unit 402, the generating unit 403 and the playing unit 404, and the technical effects brought therefrom, reference may be respectively made to related descriptions of step 101, step 102, step 103 and step 104 in the embodiment corresponding to FIG. 1, and thus details are not described herein again.

In some embodiments, the determining unit 402 is further used for: for each sound source, determining a real-time location of the sound source from a movement trajectory of the sound source, and determining the real-time orientation of the sound source relative to the head of the user on the basis of the real-time location of the sound source and real-time posture data of the head of the user.

In some embodiments, the determining unit 402 is further used for processing the first audio signal by using a sound source positioning algorithm and a sound source tracking algorithm, so as to determine the movement trajectory of each of the at least one sound source, wherein the sound source positioning algorithm is used for positioning the real-time location of the sound source, and the sound source tracking algorithm is used for determining the movement trajectory of the sound source by tracking the real-time location of the sound source.

In some embodiments, the generating unit 403 is further used for executing a first processing step for each sound source: selecting a first convolution function corresponding to the real-time orientation of the sound source, wherein the first convolution function is used for extracting, from the audio signal, the target direct audio signal corresponding to the sound source; and on the basis of the recorded audio signal corresponding to the sound source and a convolutional audio signal obtained by performing convolution with the selected first convolution function, generating the target direct audio signal corresponding to the sound source.

In some embodiments, the generating unit 403 is further used for correcting the convolutional audio signal on the basis of an actual distance between the sound source and the head of the user, so as to generate the target direct audio signal corresponding to the sound source.

In some embodiments, the generating unit 403 is further used for executing a second processing step for each sound source: encoding, in a predetermined audio encoding mode, the recorded audio signal corresponding to the sound source into a surround audio signal, wherein the surround audio signal generated in the predetermined audio encoding mode contains audio signals of a target number of channels; decoding, in an audio decoding mode corresponding to a speaker, the surround audio signal corresponding to the sound source into a target surround audio signal suitable for being played by the speaker; and performing convolution on the target surround audio signal corresponding to the sound source with a second convolution function corresponding to the speaker, so as to generate the target reverberated audio signal corresponding to the sound source, wherein the second convolution function is used for extracting, from the audio signal, the target reverberated audio signal corresponding to the sound source.

In some embodiments, the first audio signal is an audio signal recorded using a microphone array.

Figure 5:
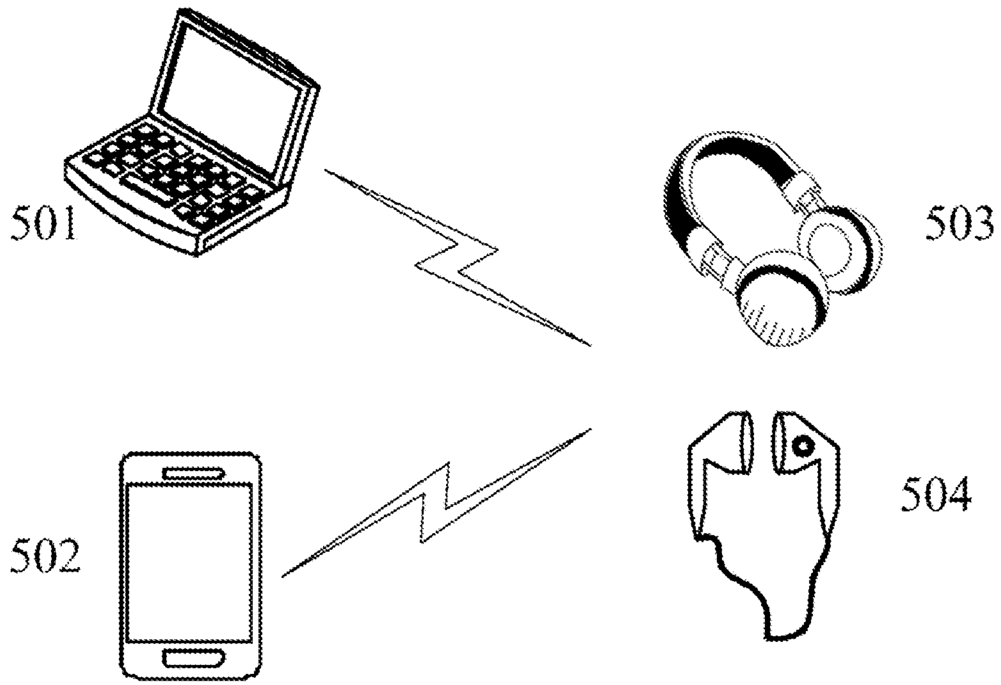
FIG. 5 is an exemplary system architecture in which an audio signal playing method of the present disclosure may be applied in some embodiments.

With further reference to FIG. 5, FIG. 5 illustrates an exemplary system architecture in which an audio signal playing method in some embodiments of the present disclosure may be applied.

As shown in FIG. 5, the system architecture may include terminal devices 501 and 502, and earphones 503 and 504, wherein the terminal devices and the earphones may establish a communication connection through Bluetooth, earphone lines, and the like.

Various applications (e.g., audio signal processing applications, audio/video playing applications, and the like) may be installed on the terminal devices 501 and 502.

In some scenarios, the terminal devices 501 and 502 may separate, from a first audio signal, a recorded audio signal corresponding to each of at least one sound source; the terminal devices 501 and 502 may determine, on the basis of the first audio signal, a real-time orientation of each of the at least one sound source relative to the head of a user; and for each sound source, the terminal devices 501 and 502 may generate, according to the real-time orientation of the sound source and the recorded audio signal corresponding to the sound source, a target direct audio signal corresponding to the sound source, and generate a target reverberated audio signal corresponding to the sound source; and the terminal devices 501 and 502 may play, by means of the earphones 503 and 504, a second audio signal generated by fusing the target direct audio signal and the target reverberated audio signal corresponding to each sound source.

In some scenarios, the terminal devices 501 and 502 may play the second audio signal via speakers disposed thereon. At this time, the system architecture shown in FIG. 5 does not contain the earphones 503 and 504.

The terminal devices 501 and 502 may be hardware or software. When the terminal devices 501 and 502 are hardware, the terminal devices 501 and 502 may be various electronic devices having audio signal playing functions, including but not limited to, smart phones, tablet computers, laptop portable computers, desktop computers, and the like. When the terminal devices 501 and 502 are software, the terminal devices 501 and 502 may be installed in the electronic devices listed above, so that a plurality of software or software modules may be implemented, and a single software or software module may also be implemented, which is not specifically limited herein.

It should be noted that the audio signal playing method provided in the embodiments of the present disclosure may be executed by the terminal device, and correspondingly, the audio signal playing apparatus may be disposed in the terminal device.

It should be understood that the number of the terminal devices and the earphones in FIG. 5 is merely illustrative. According to implementation requirements, there may be any number of terminal devices and earphones.

Figure 6:
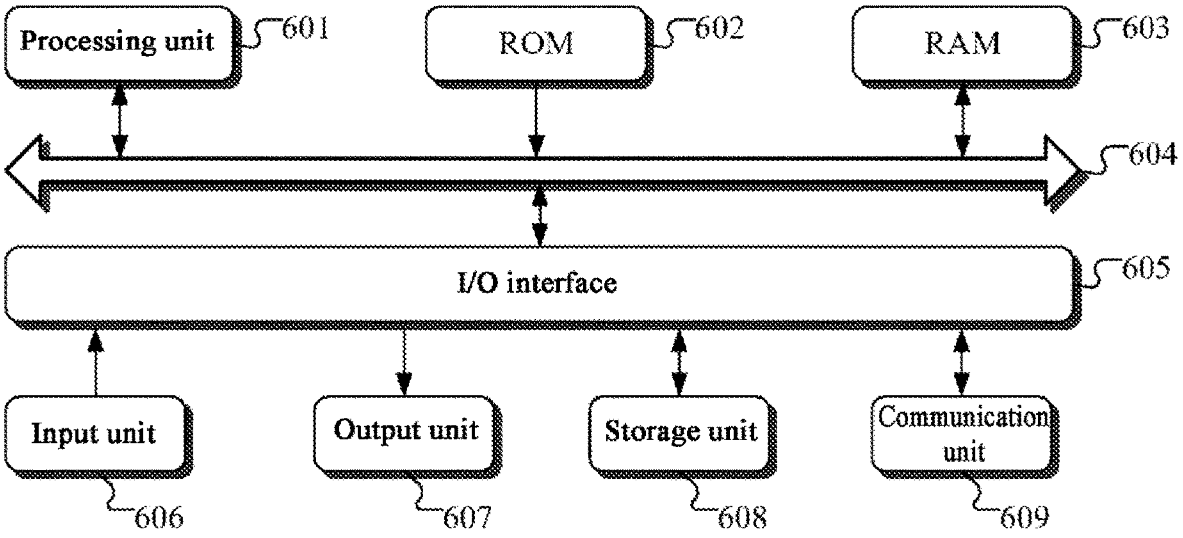
FIG. 6 is a schematic diagram of a basic structure of an electronic device provided according to some embodiments of the present disclosure.

Referring now to FIG. 6, it illustrates a schematic structural diagram of an electronic device (for example, the terminal device in FIG. 5) suitable for implementing some embodiments of the present disclosure. The terminal devices in some embodiments of the present disclosure may include, but is not limited to, mobile terminals such as mobile phones, notebook computers, digital broadcast receivers, PDAs (Personal Digital Assistants), PADs (Portable Android Devices), PMPs (Portable Media Players), vehicle-mounted terminals (e.g., vehicle-mounted navigation terminals), and the like, and fixed terminals such as digital TVs, desktop computers, and the like. The electronic device shown in FIG. 6 is merely an example, and should not bring any limitation to the functions and use ranges of the embodiments of the present disclosure.

As shown in FIG. 6, the electronic device 600 may include a processing unit (e.g., a central processing unit, a graphics processing unit, or the like) 601, which may perform various suitable actions and processes in accordance with a program stored in a read only memory (ROM) 602 or a program loaded from a storage unit 608 into a random access memory (RAM) 603. In the RAM 603, various programs and data needed by the operations of the electronic device 600 are also stored. The processing unit 601, the ROM 602 and the RAM 603 are connected to each other via a bus 604. An input/output (I/O) interface 605 is also connected to the bus 604.

In general, the following apparatuses may be connected to the I/O interface 605: an input unit 606, including, for example, a touch screen, a touch pad, a keyboard, a mouse, a camera, a microphone, an accelerometer, a gyroscope, and the like; an output unit 607, including, for example, a liquid crystal display (LCD), a speaker, a vibrator, and the like; a storage unit 608, including, for example, a magnetic tape, a hard disk, and the like; and a communication unit 609. The communication unit 609 may allow the electronic device 600 to communicate in a wireless or wired manner with other devices to exchange data. Although FIG. 6 illustrates the electronic device 600 having various apparatuses, it should be understood that not all illustrated apparatuses are required to be implemented or provided. More or fewer apparatuses may alternatively be implemented or provided. Each block shown in FIG. 6 may represent one apparatus, and may also represent a plurality of apparatuses as needed.

In particular, according to some embodiments of the present disclosure, the processes described above with reference to the flowcharts may be implemented as computer software programs. For example, some embodiments of the present disclosure include a computer program product, which includes a computer program carried on a non-transitory computer-readable medium, and the computer program contains program codes for performing the method illustrated in the flowcharts. In such embodiments, the computer program may be downloaded and installed from a network via the communication unit 609, or installed from the storage unit 608, or installed from the ROM 602. When the computer program is executed by the processing unit 601, the above functions defined in the method of the embodiments of the present disclosure are performed.

It should be noted that, the computer-readable medium described in some embodiments of the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the above. In some embodiments of the present disclosure, the computer-readable storage medium may be any tangible medium that contains or stores a program, wherein the program may be used by or in conjunction with an instruction execution system, apparatus or device. In some embodiments of the present disclosure, the computer-readable signal medium may include a data signal that is propagated in a baseband or as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. Program codes contained on the computer-readable medium may be transmitted with any suitable medium, including, but not limited to: an electrical wire, an optical cable, RF (radio frequency), and the like, or any suitable combination thereof.

In some implementations, a client and a server may perform communication by using any currently known or future-developed network protocol, such as an HTTP (HyperText Transfer Protocol), and may be interconnected with any form or medium of digital data communication (e.g., a communication network). Examples of the communication network include a local area network ("LAN"), a wide area network ("WANs"), an international network (e.g., the Internet), and a peer-to-peer network (e.g., an ad hoc peer-to-peer network), as well as any currently known or future-developed network.

The computer-readable medium may be contained in the above electronic device, and it may also be present separately and is not assembled into the electronic device. The computer-readable medium carries one or more programs that, when executed by the electronic device, cause the electronic device to execute the following steps: separating, from a first audio signal, a recorded audio signal corresponding to each of at least one sound source; on the basis of the first audio signal, determining a real-time orientation of each of the at least one sound source relative to the head of a user; for each sound source, according to the real-time orientation of the sound source and the recorded audio signal corresponding to the sound source, generating a target direct audio signal corresponding to the sound source, and generating a target reverberated audio signal corresponding to the sound source; and playing a second audio signal generated by fusing the target direct audio signal and the target reverberated audio signal corresponding to each sound source.

Computer program codes for executing the operations of the present disclosure may be written in one or more programming languages or combinations thereof. The programming languages include object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or a server. In the case involving the remote computer, the remote computer may be connected to the user computer through any type of network, including a local area network (LAN) or a wide area network (WAN), or it may be connected to an external computer (e.g., through the Internet using an Internet service provider).

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions annotated in the block may occur out of the order annotated in the drawings. For example, two blocks shown in succession may, in fact, be executed substantially concurrently, or the blocks may sometimes be executed in a reverse order, depending upon the functions involved. It should also be noted that each block in the block diagrams and/or flowcharts, and combinations of the blocks in the block diagrams and/or flowcharts may be implemented by dedicated hardware-based systems for performing specified functions or operations, or combinations of dedicated hardware and computer instructions.

The units involved in the described embodiments of the present disclosure may be implemented in a software or hardware manner. The names of the units do not constitute limitations of the units themselves in a certain case. For example, the determining unit may also be described as a unit for "on the basis of a first audio signal, determining a real-time orientation of each of the at least one sound source relative to the head of a user".

The functions described herein above may be performed, at least in part, by one or more hardware logic components. For example, without limitation, example types of the hardware logic components that may be used include: a field programmable gate array (FPGA), an application specific integrated circuit (ASIC), an application specific standard product (ASSP), a system on chip (SOC), a complex programmable logic device (CPLD), and so on.

In the context of the present disclosure, a machine-readable medium may be a tangible medium, which may contain or store a program for use by or in conjunction with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or a flash memory), an optical fiber, a compact disc-read-only memory (CD-ROM), an optical storage device, a magnetic storage device, or any suitable combination thereof.

What have been described above are only preferred embodiments of the present disclosure and illustrations of the technical principles employed. It will be appreciated by those skilled in the art that the disclosure scope involved in the embodiments of the preset disclosure is not limited to the technical solutions formed by specific combinations of the above technical features, and meanwhile should also include other technical solutions formed by any combinations of the above technical features or equivalent features thereof without departing from the concept of the disclosure, for example, technical solutions formed by mutual replacement of the above features with technical features having similar functions disclosed in the present disclosure (but is not limited to).

In addition, although various operations are depicted in a particular order, this should not be understood as requiring that these operations are performed in the particular order shown or in a sequential order. In certain circumstances, multitasking and parallel processing may be advantageous. Similarly, although several specific implementation details have been contained in the above discussion, these should not be construed as limiting the scope of the present disclosure. Certain features that are described in the context of separate embodiments may also be implemented in combination in a single embodiment. Conversely, various features that are described in the context of a single embodiment may also be implemented in a plurality of embodiments separately or in any suitable sub-combination.

Although the present theme has been described in language specific to structural features and/or methodological actions, it should be understood that the theme defined in the appended claims is not necessarily limited to the specific features or actions described above. Rather, the specific features and actions described above are merely example forms of implementing the claims.

The invention claimed is:

1. An audio signal playing method, comprising:

separating, from a first audio signal, a recorded audio signal corresponding to each of at least one sound source;

determining, on the basis of the first audio signal, a real-time orientation of each of the at least one sound source relative to the head of a user;

for each sound source, according to the real-time orientation of the sound source and the recorded audio signal corresponding to the sound source, generating a target direct audio signal corresponding to the sound source, and generating a target reverberated audio signal corresponding to the sound source; and playing a second audio signal generated by fusing the target direct audio signal and the target reverberated audio signal corresponding to each sound source, wherein generating the target direct audio signal corresponding to the sound source comprises executing a first processing step for each sound source, comprising:

selecting a first convolution function corresponding to the real-time orientation of the sound source, wherein the first convolution function is used for extracting, from the audio signal, the target direct audio signal corresponding to the sound source; and on the basis of the recorded audio signal corresponding to the sound source and a convolutional audio signal obtained by performing convolution with the selected first convolution function, generating the target direct audio signal corresponding to the sound source.

2. The method according to claim 1, wherein on the basis of the first audio signal, determining the real-time orientation of each of the at least one sound source relative to the head of the user, comprises:

determining, on the basis of the first audio signal, a movement trajectory of each of the at least one sound source; and for each sound source, determining a real-time location of the sound source from the movement trajectory of the sound source, and determining the real-time orientation of the sound source relative to the head of the user on the basis of the real-time location of the sound source and real-time posture data of the head of the user.

3. The method according to claim 2, wherein determining, on the basis of the first audio signal, the movement trajectory of each of the at least one sound source, comprises:

processing the first audio signal by using a sound source positioning algorithm and a sound source tracking algorithm, so as to determine the movement trajectory of each of the at least one sound source, wherein the sound source positioning algorithm is used for positioning the real-time location of the sound source, and the sound source tracking algorithm is used for determining the movement trajectory of the sound source by tracking the real-time location of the sound source.

4. The method according to claim 1, wherein on the basis of the recorded audio signal corresponding to the sound source and the convolutional audio signal obtained by performing convolution with the selected first convolution function, generating the target direct audio signal corresponding to the sound source, comprises:

correcting the convolutional audio signal on the basis of an actual distance between the sound source and the head of the user, so as to generate the target direct audio signal corresponding to the sound source.

5. The method according to claim 1, wherein generating the target reverberated audio signal corresponding to the sound source comprises executing a second processing step for each sound source, comprising:

encoding, in a predetermined audio encoding mode, the recorded audio signal corresponding to the sound source into a surround audio signal, wherein the surround audio signal generated in the predetermined audio encoding mode contains audio signals of a target number of channels;

decoding, in an audio decoding mode corresponding to a speaker, the surround audio signal corresponding to the sound source into a target surround audio signal suitable for being played by the speaker; and performing convolution on the target surround audio signal corresponding to the sound source with a second convolution function corresponding to the speaker, so as to generate the target reverberated audio signal corresponding to the sound source, wherein the second convolution function is used for extracting, from the audio signal, the target reverberated audio signal corresponding to the sound source.

6. The method according to claim 1, wherein the first audio signal is an audio signal recorded using a microphone array.

7. An electronic device, comprising:

at least one processor; and a storage, used for storing at least one program, wherein the at least one program, when executed by the at least one processor, causes the at least one processor to:

separate, from a first audio signal, a recorded audio signal corresponding to each of at least one sound source;

determine, on the basis of the first audio signal, a real-time orientation of each of the at least one sound source relative to the head of a user;

for each sound source, according to the real-time orientation of the sound source and the recorded audio signal corresponding to the sound source, generate a target direct audio signal corresponding to the sound source, and generating a target reverberated audio signal corresponding to the sound source; and play a second audio signal generated by fusing the target direct audio signal and the target reverberated audio signal corresponding to each sound source, wherein the generation of the target direct audio signal corresponding to the sound source comprises executing a first processing step for each sound source, comprising:

selecting a first convolution function corresponding to the real-time orientation of the sound source, wherein the first convolution function is used for extracting, from the audio signal, the target direct audio signal corresponding to the sound source; and on the basis of the recorded audio signal corresponding to the sound source and a convolutional audio signal obtained by performing convolution with the selected first convolution function, generating the target direct audio signal corresponding to the sound source.

8. The electronic device according to claim 7, wherein the determination of the real-time orientation of each of the at least one sound source relative to the head of the user comprises:

determining, on the basis of the first audio signal, a movement trajectory of each of the at least one sound source; and for each sound source, determining a real-time location of the sound source from the movement trajectory of the sound source, and determining the real-time orientation of the sound source relative to the head of the user on the basis of the real-time location of the sound source and real-time posture data of the head of the user.

9. The electronic device according to claim 8, wherein determining, on the basis of the first audio signal, the movement trajectory of each of the at least one sound source, comprises:

processing the first audio signal by using a sound source positioning algorithm and a sound source tracking algorithm, so as to determine the movement trajectory of each of the at least one sound source, wherein the sound source positioning algorithm is used for positioning the real-time location of the sound source, and the sound source tracking algorithm is used for determining the movement trajectory of the sound source by tracking the real-time location of the sound source.

10. The electronic device according to claim 7, wherein on the basis of the recorded audio signal corresponding to the sound source and the convolutional audio signal obtained by performing convolution with the selected first convolution function, generating the target direct audio signal corresponding to the sound source, comprises:

correcting the convolutional audio signal on the basis of an actual distance between the sound source and the head of the user, so as to generate the target direct audio signal corresponding to the sound source.

11. The electronic device according to claim 7, wherein the generation of the target reverberated audio signal corresponding to the sound source comprises executing a second processing step for each sound source, comprising:

encoding, in a predetermined audio encoding mode, the recorded audio signal corresponding to the sound source into a surround audio signal, wherein the surround audio signal generated in the predetermined audio encoding mode contains audio signals of a target number of channels;

decoding, in an audio decoding mode corresponding to a speaker, the surround audio signal corresponding to the sound source into a target surround audio signal suitable for being played by the speaker; and performing convolution on the target surround audio signal corresponding to the sound source with a second convolution function corresponding to the speaker, so as to generate the target reverberated audio signal corresponding to the sound source, wherein the second convolution function is used for extracting, from the audio signal, the target reverberated audio signal corresponding to the sound source.

12. The electronic device according to claim 7, wherein the first audio signal is an audio signal recorded using a microphone array.

13. A non-transitory computer-readable medium, on which a computer program is stored, wherein the computer program, when executed by a processor, causes the processor to:

separate, from a first audio signal, a recorded audio signal corresponding to each of at least one sound source;

determine, on the basis of the first audio signal, a real-time orientation of each of the at least one sound source relative to the head of a user;

for each sound source, according to the real-time orientation of the sound source and the recorded audio signal corresponding to the sound source, generate a target direct audio signal corresponding to the sound source, and generating a target reverberated audio signal corresponding to the sound source; and play a second audio signal generated by fusing the target direct audio signal and the target reverberated audio signal corresponding to each sound source, wherein the generation of the target direct audio signal corresponding to the sound source comprises executing a first processing step for each sound source, comprising:

selecting a first convolution function corresponding to the real-time orientation of the sound source, wherein the first convolution function is used for extracting, from the audio signal, the target direct audio signal corresponding to the sound source; and on the basis of the recorded audio signal corresponding to the sound source and a convolutional audio signal obtained by performing convolution with the selected first convolution function, generating the target direct audio signal corresponding to the sound source.

14. The non-transitory computer-readable medium according to claim 13, wherein the determination of the real-time orientation of each of the at least one sound source relative to the head of the user comprises:

determining, on the basis of the first audio signal, a movement trajectory of each of the at least one sound source; and for each sound source, determining a real-time location of the sound source from the movement trajectory of the sound source, and determining the real-time orientation of the sound source relative to the head of the user on the basis of the real-time location of the sound source and real-time posture data of the head of the user.

15. The non-transitory computer-readable medium according to claim 14, wherein determining, on the basis of the first audio signal, the movement trajectory of each of the at least one sound source, comprises:

processing the first audio signal by using a sound source positioning algorithm and a sound source tracking algorithm, so as to determine the movement trajectory of each of the at least one sound source, wherein the sound source positioning algorithm is used for positioning the real-time location of the sound source, and the sound source tracking algorithm is used for determining the movement trajectory of the sound source by tracking the real-time location of the sound source.

16. The non-transitory computer-readable medium according to claim 13, wherein on the basis of the recorded audio signal corresponding to the sound source and the convolutional audio signal obtained by performing convolution with the selected first convolution function, generating the target direct audio signal corresponding to the sound source, comprises:

correcting the convolutional audio signal on the basis of an actual distance between the sound source and the head of the user, so as to generate the target direct audio signal corresponding to the sound source.

17. The non-transitory computer-readable medium according to claim 13, wherein the generation of the target reverberated audio signal corresponding to the sound source comprises executing a second processing step for each sound source, comprising:

encoding, in a predetermined audio encoding mode, the recorded audio signal corresponding to the sound source into a surround audio signal, wherein the surround audio signal generated in the predetermined audio encoding mode contains audio signals of a target number of channels;

decoding, in an audio decoding mode corresponding to a speaker, the surround audio signal corresponding to the sound source into a target surround audio signal suitable for being played by the speaker; and performing convolution on the target surround audio signal corresponding to the sound source with a second convolution function corresponding to the speaker, so as to generate the target reverberated audio signal corresponding to the sound source, wherein the second convolution function is used for extracting, from the audio signal, the target reverberated audio signal corresponding to the sound source.

* * * * *